US008936195B1

(12) United States Patent
Chang

(10) Patent No.: US 8,936,195 B1
(45) Date of Patent: Jan. 20, 2015

(54) BARCODE READING APPARATUS

(71) Applicant: Wistron Corporation, New Taipei (TW)

(72) Inventor: Sung-Ling Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/152,069

(22) Filed: Jan. 10, 2014

(30) Foreign Application Priority Data

Aug. 23, 2013 (TW) .............................. 102130365 A

(51) Int. Cl.
*G06K 7/10* (2006.01)
*G06K 9/24* (2006.01)
*G06K 7/015* (2006.01)

(52) U.S. Cl.
CPC ............ *G06K 7/015* (2013.01); *G06K 7/10831* (2013.01)
USPC ................................. 235/462.21; 235/462.24

(58) Field of Classification Search
CPC ............. G06K 7/10; G06K 9/24; G06K 5/00; G06K 7/14; G03B 7/08; G08C 21/00
USPC .............. 235/462.21, 462.24, 462.06, 462.42
See application file for complete search history.

(56) References Cited

U.S. PATENT DOCUMENTS

| 2007/0108284 | A1* | 5/2007 | Pankow et al. ................. 235/454 |
| 2008/0223934 | A1* | 9/2008 | Havens et al. ........... 235/462.42 |
| 2009/0277963 | A1* | 11/2009 | Van Kerkhoven et al. ......................... 235/462.21 |
| 2009/0310193 | A1* | 12/2009 | Endo et al. ..................... 358/474 |

FOREIGN PATENT DOCUMENTS

TW        I271596 B       1/2007

* cited by examiner

*Primary Examiner* — Edwyn Labaze
(74) *Attorney, Agent, or Firm* — Rabin & Berdo, P.C.

(57) ABSTRACT

A barcode reading apparatus includes a substrate, an image sensing module, an optical lens module, and a plurality of light sources. The image sensing module is disposed on the substrate; the optical lens module includes a first end and a second end opposite to the first end, where the second end is connected to the image sensing module; and the plurality of light sources is disposed around the optical lens module, where a connection line of disposition positions of the light sources is axially or radially symmetric.

6 Claims, 19 Drawing Sheets

BARCODE READING APPARATUS

CROSS-REFERENCES TO RELATED APPLICATIONS

This non-provisional application claims priority under 35 U.S.C. §119(a) on Patent Application No. 102130365 filed in Taiwan, R.O.C. on 2013 Aug. 23, the entire contents of which are hereby incorporated by reference.

BACKGROUND

1. Technical Field

The present invention relates to a barcode reading apparatus, and more particularly to a barcode reading apparatus provided with a plurality of light sources and distributing projection light beams on the periphery of an optical lens module, so that a user can correctly acquire a position of a barcode.

2. Related Art

Various barcodes are often used for labeling information about products, including places of production, manufacturers, product models, dates, inventories, book classification codes, mail classification codes, categories, and the like, and therefore are widely applied in many fields like commodity circulation, inventory management, book management, postal service management, and banking systems. Common barcodes include 1D barcodes which are formed by multiple black bars and blanks having unequal widths and arranged according to a certain coding rule, and 2D barcodes which represent binary data content through positions and distribution of black and white rectangular patterns.

However, a barcode reading apparatus is needed when data represented by a barcode is read. As shown in FIG. 1, a light source 11 of a conventional barcode reading apparatus 1 is disposed adjacent to one side of an optical lens 12 and an image acquisition module 13, and reads data on the barcode through cooperation with the optical lens 12 and the image acquisition module 13. Generally speaking, the barcode can be read when an optical axis 121 of the optical lens 12 is aligned with the barcode to be read. However, because the light source 11 is disposed at one side of the optical lens 12, the position indicated by a projection light beam emitted from the light source 11 actually is inconsistent with the position pointed to by the optical axis 121 of the optical lens 12 (namely, the position of an image acquired by the image acquisition module 13).

Therefore, a user often mistakes the position indicated by the projection light beam for an image acquisition position of the image acquisition module 13 when operating the conventional barcode reading apparatus 1 to read a barcode, causing a barcode read failure.

To sum up, the prior art often causes a barcode read failure and gives rise to problems such as reduced data read efficiency, increased time cost, and extended working hours, which is actually an urgent issue to be dealt with immediately in market application.

SUMMARY

In view of the above, the present invention provides a barcode reading apparatus, including a substrate, an image sensing module, an optical lens module, and a plurality of light sources. The image sensing module is disposed on the substrate; the optical lens module includes a first end and a second end opposite to the first end, where the second end is connected to the image sensing module; and the plurality of light sources is disposed around the optical lens module, where a connection line of disposition positions of the light sources is axially or radially symmetric.

The present invention is characterized in that a barcode read position is indicated by projection light beams emitted from the light sources disposed around the optical lens module, and since the connection line of the disposition positions of the light sources is axially or radially symmetric, a user can make the image sensing module accurately read a barcode according to the indication of the projection light beams emitted from the light sources within the distance that can be sensed by the image sensing module.

The detailed features and advantages of the present invention are described below in great detail through the following embodiments, and the content of the detailed description is sufficient for those skilled in the art to understand the technical content of the present invention and to implement the present invention accordingly. Based upon the content of the specification, the claims, and the drawings, those skilled in the art can easily understand the relevant objectives and advantages of the present invention.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
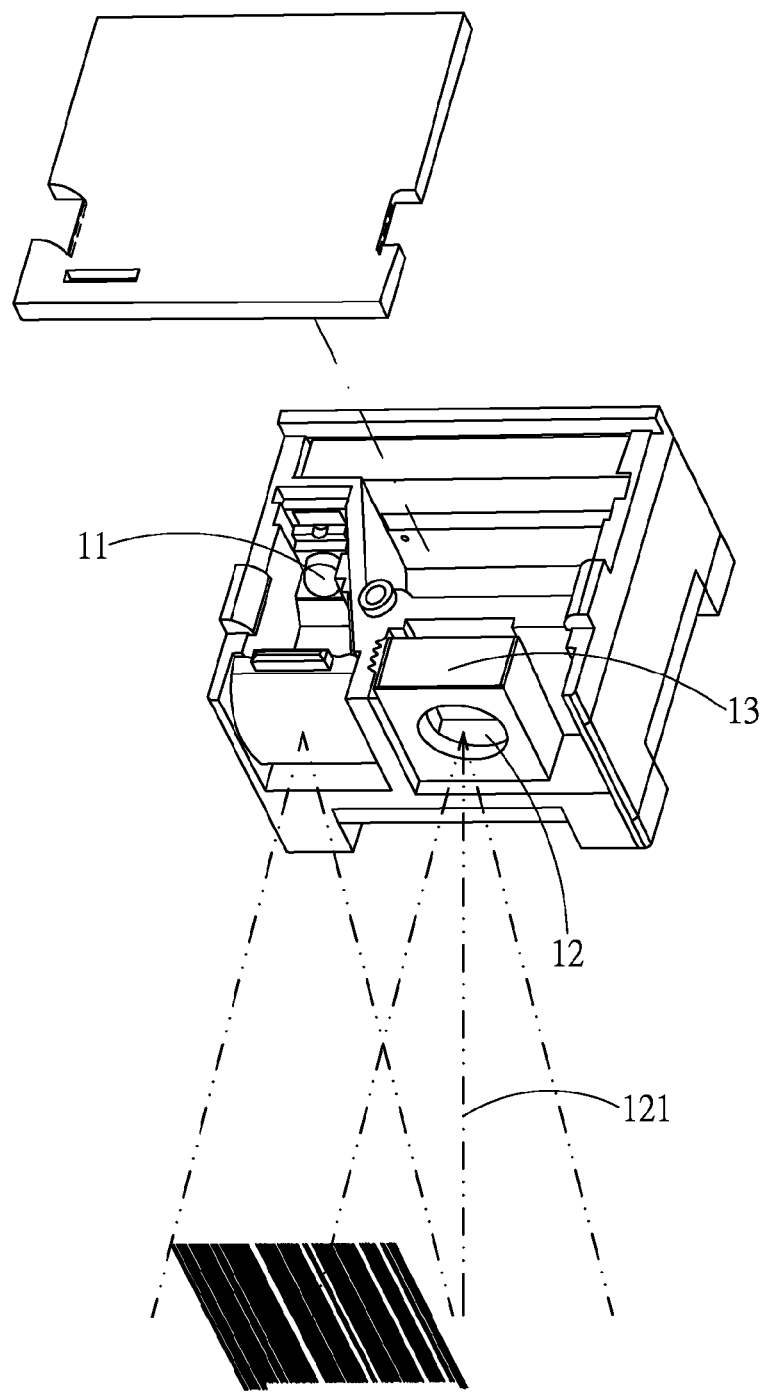
FIG. 1 is a schematic view illustrating a structure of a conventional barcode reading apparatus.
Figure 2A:
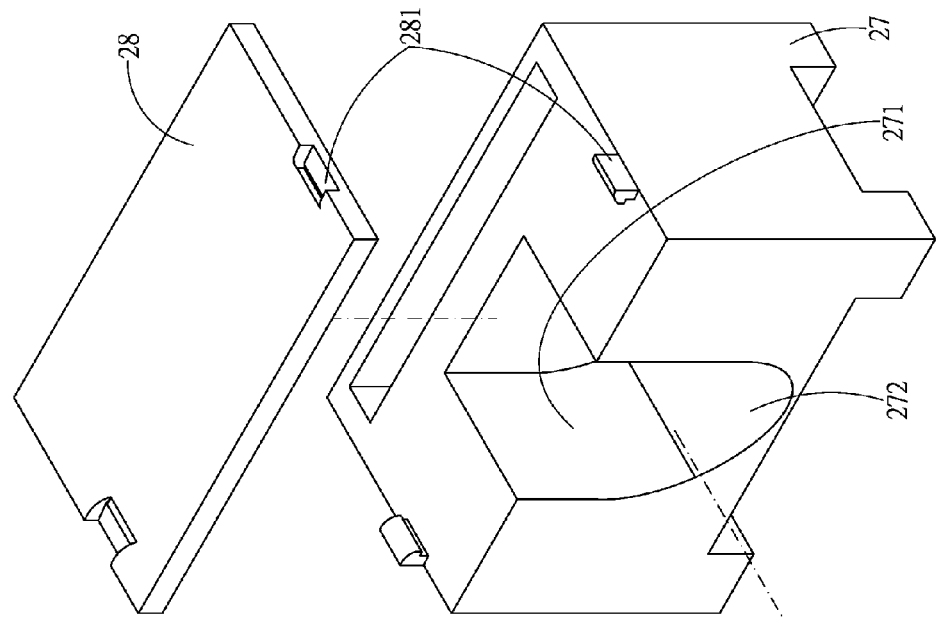
FIG. 2A is an exploded three-dimensional view illustrating a structure of a first embodiment of the present invention.
Figure 2A:
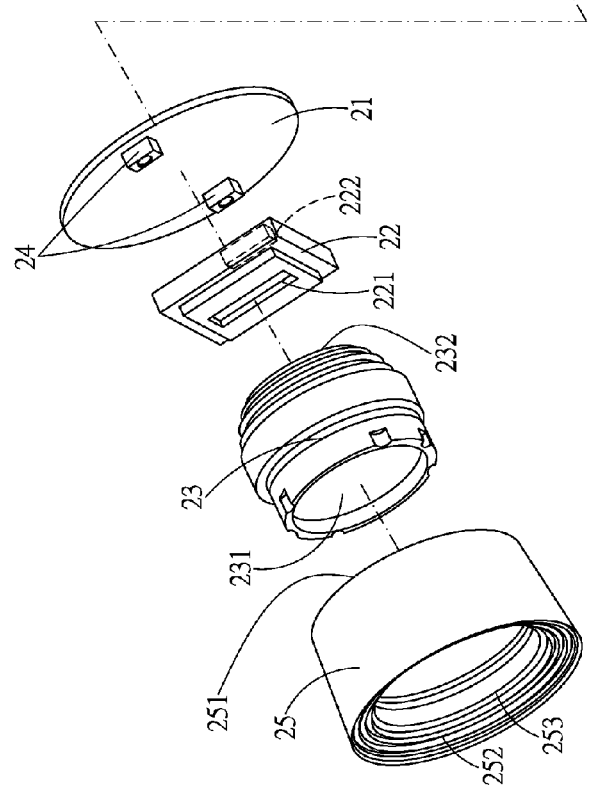
Figure 2B:
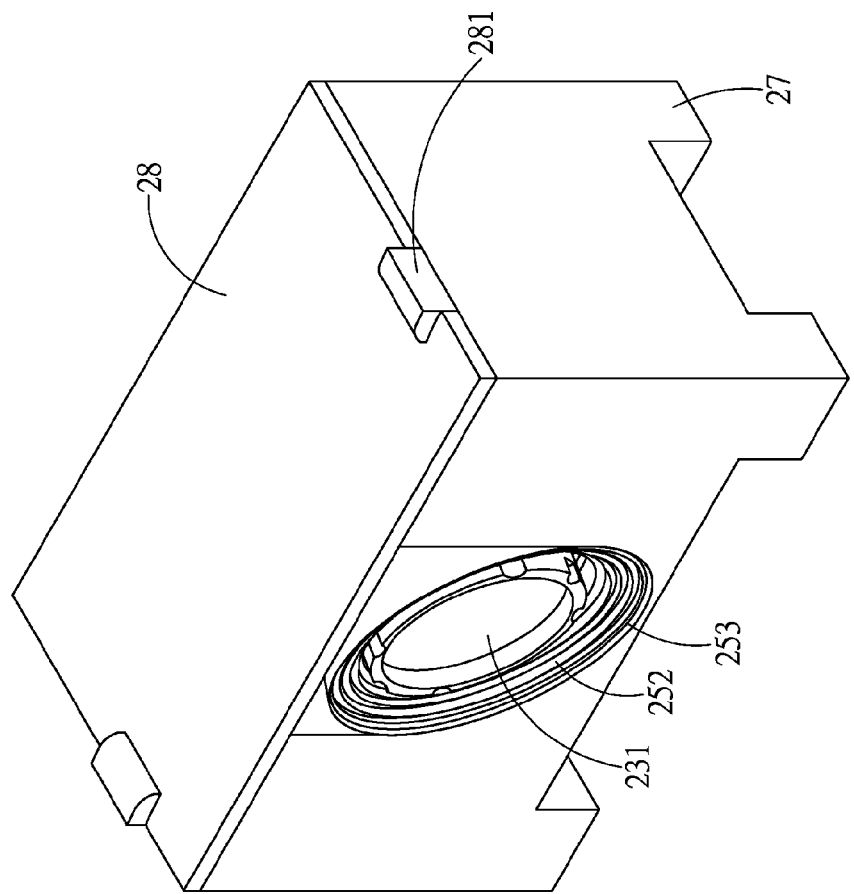
FIG. 2B is an outside three-dimensional view illustrating the structure of the first embodiment of the present invention.

Referring to FIG. 2A and FIG. 2B, they are respectively an exploded three-dimensional view and an outside three-dimensional view illustrating a structure of a first embodiment of the present invention. In an embodiment, the present invention discloses a barcode reading apparatus 2, including a substrate 21, an image sensing module 22, an optical lens module 23, and a plurality of light sources 24.

The substrate 21 may be a circuit board, electrically connected or signal-connected to various electronic elements, for example, a processing unit, a signal input module, a power supply, and the like, but the present invention is not limited thereto. In this way, signals of the electronic elements can be signal-transmitted via the substrate 21 to other elements. In an implementation aspect, the substrate 21 is a Flexible Printed Circuit (FPC) board.

The image sensing module 22 is disposed on the substrate 21 and is electrically connected to the substrate 21. In an implementation aspect, the image sensing module 22 includes an image sensor 221 and a processing unit 222, the image sensor 221 and the processing unit 222 being signal-connected to each other. In an implementation aspect, the processing unit 222 may be a Central Processing Unit (CPU) or a circuit for interpreting a barcode, and the present invention is not limited thereto. The image sensor 221 acquires frame data on a reading surface 5 and then delivers the data to the processing unit 222; the processing unit 222 reads and determines whether the data is barcode data; if yes, the processing unit 222 further interprets information, for example, a price, an inventory, a date of manufacture of a product, represented by the barcode data, and the present invention is not limited thereto. In other implementation aspects, the image sensing module 22 does not include the processing unit 222, and the processing unit 222 is installed at another position of the barcode reading apparatus 2.

Figure 3:
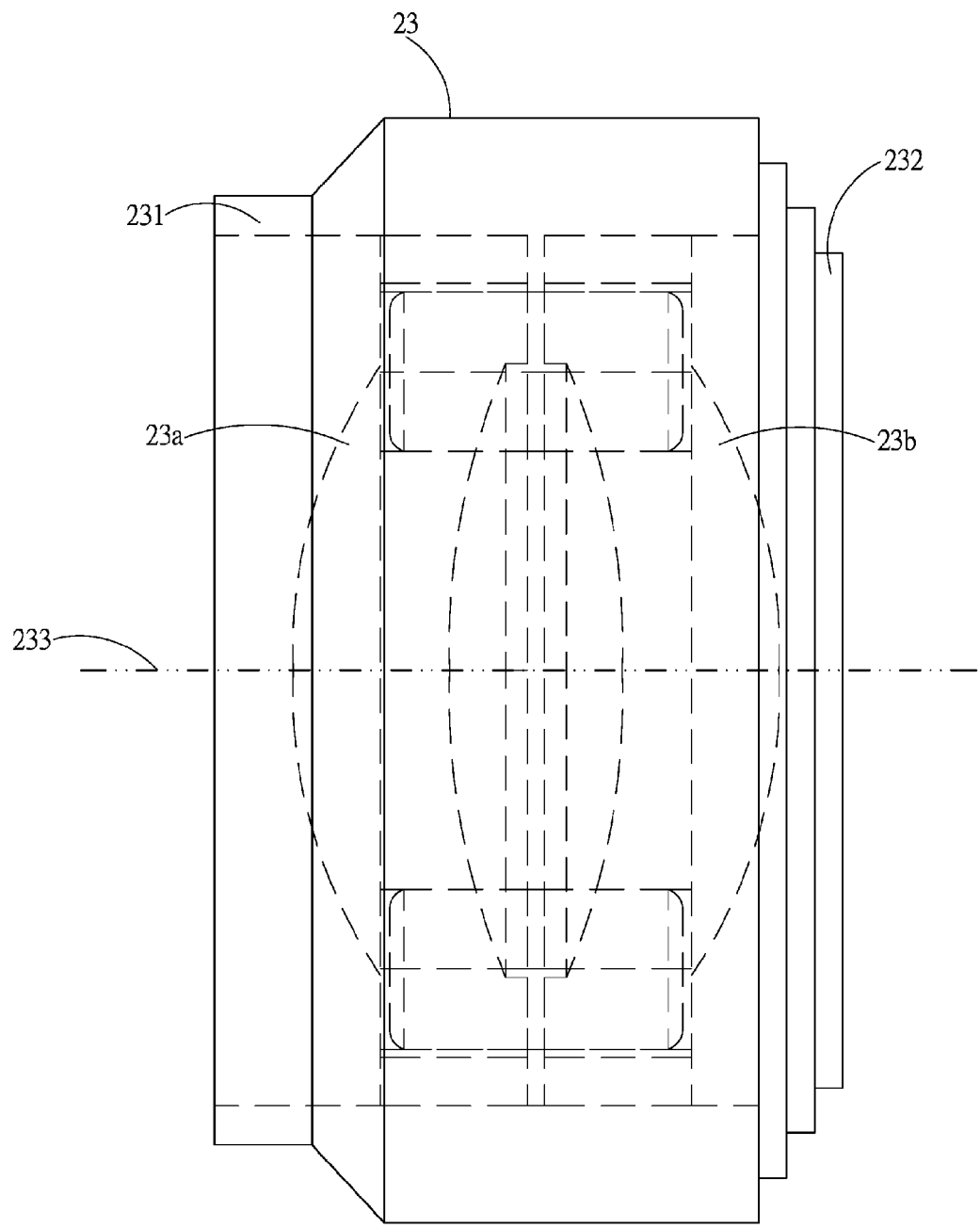
FIG. 3 is a partial side view illustrating the structure of the first embodiment of the present invention.
Figure 4A:
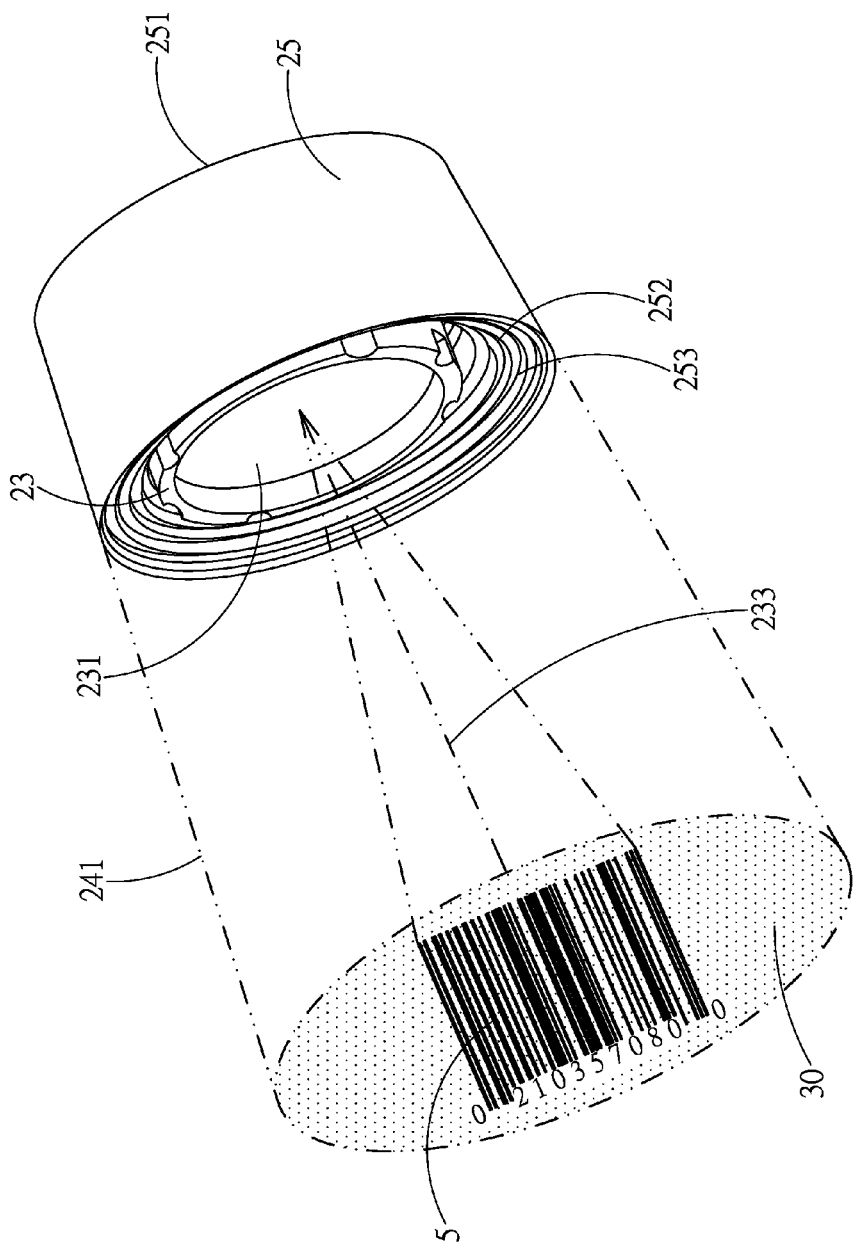
FIG. 4A is a schematic view (I) illustrating a use state of the first embodiment of the present invention.
Figure 4B:
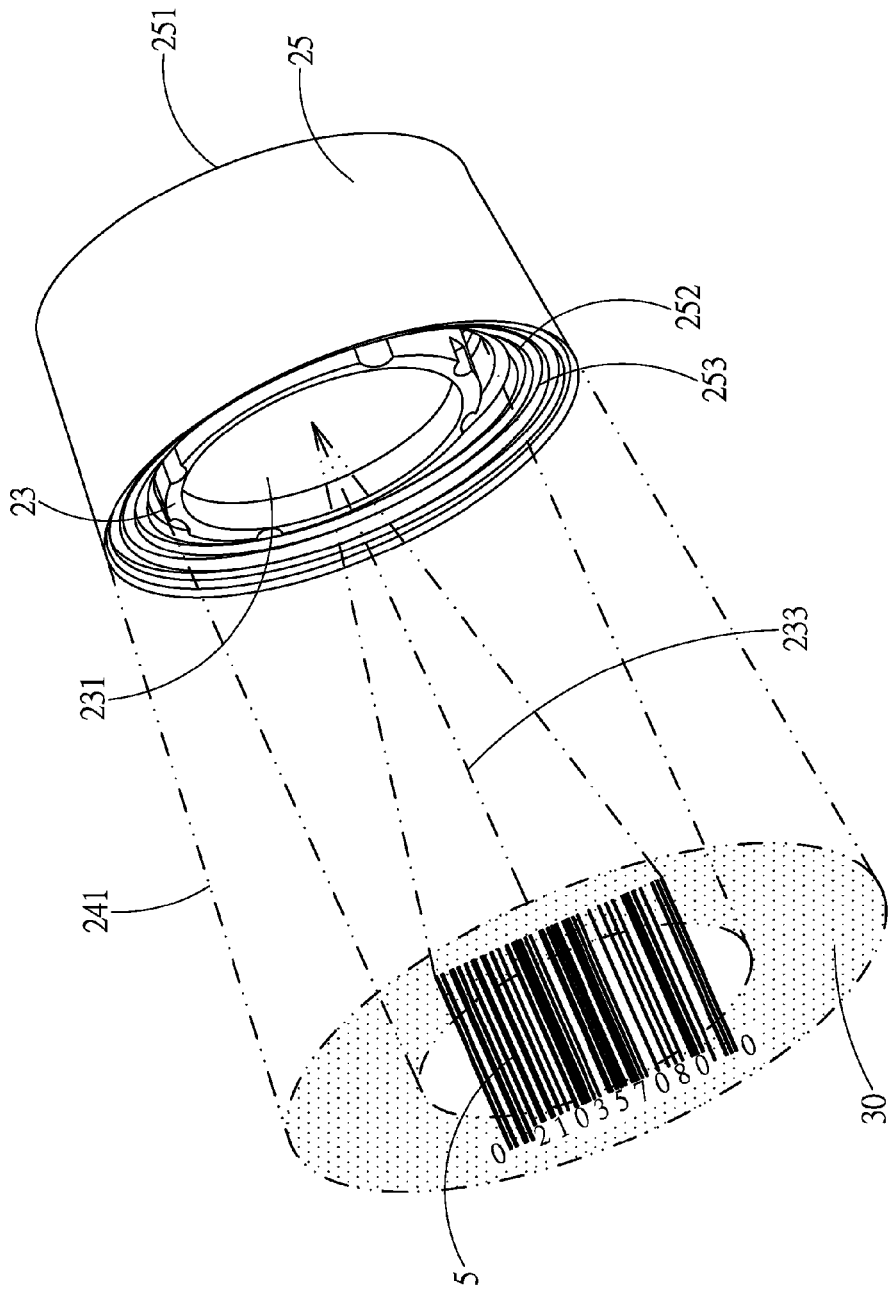
FIG. 4B is a schematic view (II) illustrating a use state of the first embodiment of the present invention.

The optical lens module 23 includes a first end 231 and a second end 232 opposite to the first end 231, where the second end 232 is adjacent to the image sensing module 22. In an implementation aspect, referring to FIG. 3, which is a partial side view illustrating the structure of the first embodiment of the present invention, the first end 231 and the second end 232 are provided with corresponding imaging lenses 23a and 23b, respectively. An external image passes through the imaging lens 23a at the first end 231, then passes through the imaging lens 23b at the second end 232, and reaches the image sensing module 22. In addition, one surface of the imaging lens 23a (or 23b) is a spherical surface. The imaging lens 23a (23b) also has an optical axis 233. The optical axis 233 is an optical symmetry axis of the imaging lens 23a. In an implementation aspect, the optical axis of the imaging lens 23a at the first end 231 and the optical axis of the imaging lens 23b at the second end 232 are the same optical axis 233, namely, the optical axis 233 of the optical lens module 23. Referring to FIG. 4A and FIG. 4B, they are schematic views (I) and (II) illustrating use states of the first embodiment of the present invention. When the barcode reading apparatus 2 reads a barcode on the reading surface 5, a region image on the reading surface 5 and with the optical axis 233 as a center is acquired by the image sensing module 22 via the optical lens module 23.

The plurality of light sources 24 is disposed around the optical lens module 23. In an implementation aspect, the light sources 24 may be light emitting diodes or lasers, but the present invention is not limited thereto. In an implementation aspect, the light sources 24 are electrically connected to the substrate 21 and are disposed around the image sensing module 22, and a connection line of disposition positions of the light sources 24 is axially or radially symmetric. In an implementation aspect, when projection light beams 241 emitted from the light sources 24 irradiate on the reading surface 5, the projection light beams 241 intersect with the optical axis 233 of the optical lens module 23. In another implementation aspect, when projection light beams 241 emitted from the light sources 24 irradiate on the reading surface 5, the projection light beams 241 surround the optical axis 233 of the optical lens module 23. In an implementation aspect, the connection line of the disposition positions of the light sources 24 forms a shape selected from a group consisting of a straight line, a regular triangle, a square, a regular pentagon, and a regular hexagon.

In an embodiment, the present invention further includes a housing 27 and a cover 28. The housing 27 and the cover 28 each have a corresponding snapping structure 281, so that they can be fixed in a matching manner. In another implementation aspect, the housing 27 and the cover 28 may also be locked through matching of a screw and a screw hole. The housing 27 includes an accommodating space 271 and an opening 272. The accommodating space 271 may be provided with elements such as the substrate 21, the image sensing module 22, the optical lens module 23, and the plurality of light sources 24, and the present invention is not limited thereto. Projection light beams 241 emitted from the light sources 24 may advance from the inside of the housing 27, via the opening 272, towards the reading surface 5. In an implementation aspect, the first end 231 of the optical lens module 23 is disposed in the opening 272, and the image sensing module 22 may also acquire a frame on the reading surface 5 via the opening 272.

Still referring to FIG. 2A and FIG. 2B, they are respectively an exploded three-dimensional view and an outside three-dimensional view illustrating the structure of the first embodiment of the present invention. In an embodiment, the present invention further includes an annular lens 25 disposed around of the optical lens module 23, that is, the annular lens 25 is sleeved on the periphery of the optical lens module 23. The annular lens 25 includes a light incident surface 251 and a light exit surface 252 opposite to the light incident surface 251. The light incident surface 251 corresponds to the light sources 24, that is, the light incident surface 251 is joined to the light sources 24, and light beams emitted from the light sources 24 are transmitted to the light exit surface 252 via the light incident surface 251 and form projection light beams 241.

On the basis of the aforementioned embodiment, as shown in FIG. 2A and FIG. 2B, the annular lens 25 includes an optical structure 253. In this embodiment, the optical structure 253 includes a structure on the light exit surface 252 and roughly of a ladder shape. Compared with the first end 231 of the optical lens module 23, the periphery of the light exit surface 252 is higher than that of the first end 231. Under the effect of the optical structure 253, the light beams emitted from the light sources 24 pass through the annular lens 25 and form the projection light beams 241; if the advancing directions of the projection light beams 241 from the light exit surfaces 252 to the reading surface 5 are parallel to the optical axis 233 of the optical lens module 23, the projection light beams 241 surround the optical axis 233 of the optical lens module 23; if the advancing directions of the projection light beams 241 from the light exit surfaces 252 to the reading surface 5 are not parallel to the optical axis 233 of the optical lens module 23 and shrink gradually, the projection light beams 241 and the optical axis 233 of the optical lens module 23 intersect at a specific distance.

Still referring to FIG. 4A and FIG. 4B, they are respectively schematic views (I) and (II) illustrating use states of the first embodiment of the present invention. In an implementation aspect, the projection light beams 241 formed by the light beams emitted from the light sources 24 after passing through the annular lens 25 form a circular projection pattern 30 when irradiating on a reading surface 5, and the optical axis 233 of the optical lens module 23 passes through the center of circle of the circular projection pattern 30. In another implementation aspect, the circular projection pattern 30 may be an annular projection pattern 30, and the optical axis 233 of the optical lens module 23 passes through the center of the annular projection pattern 30, that is, the projection light beams 241 surround the optical axis 233 of the optical lens module 23.

Figure 5A:
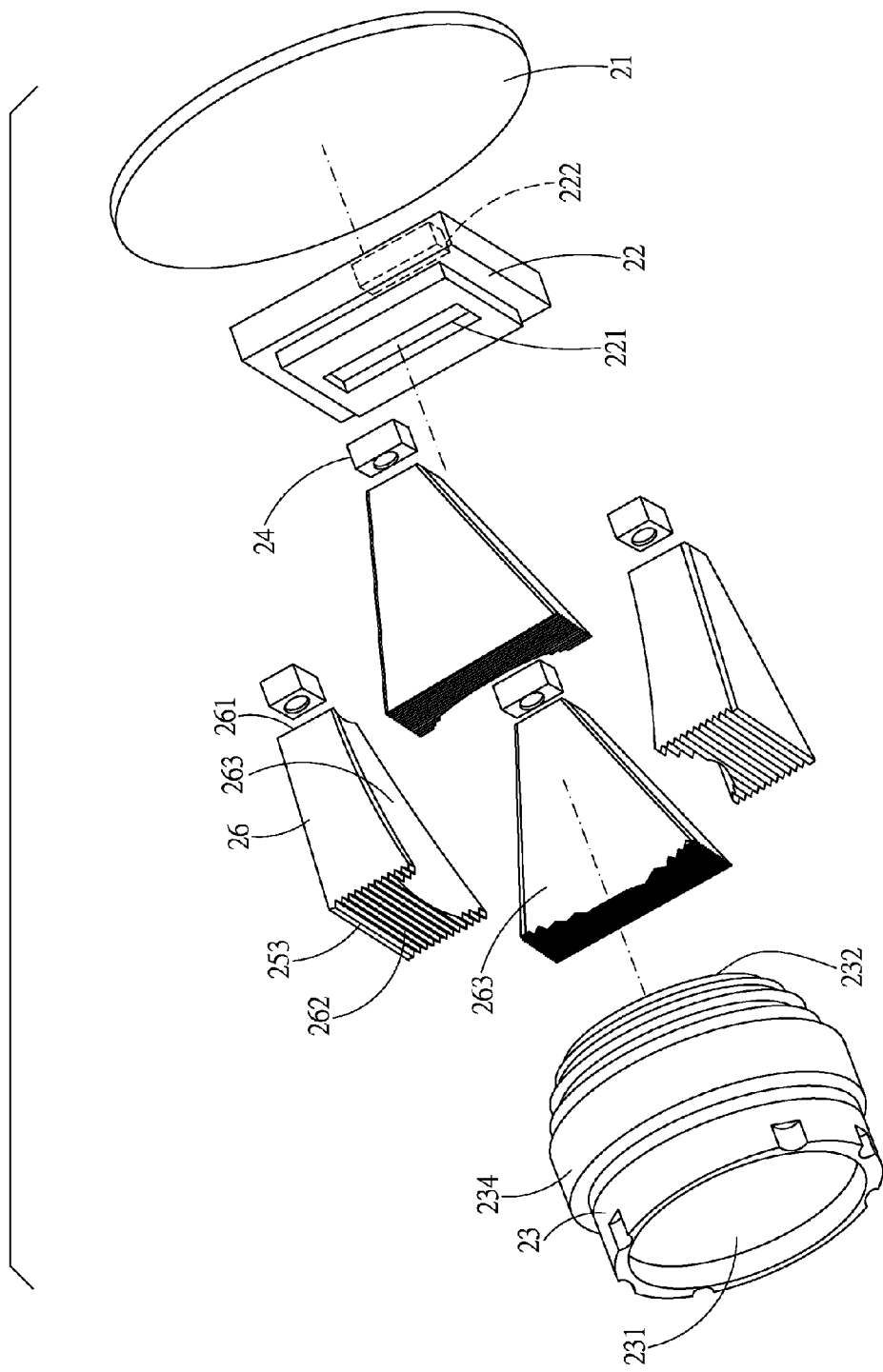
FIG. 5A is an exploded three-dimensional view illustrating a structure of a second embodiment of the present invention.
Figure 5B:
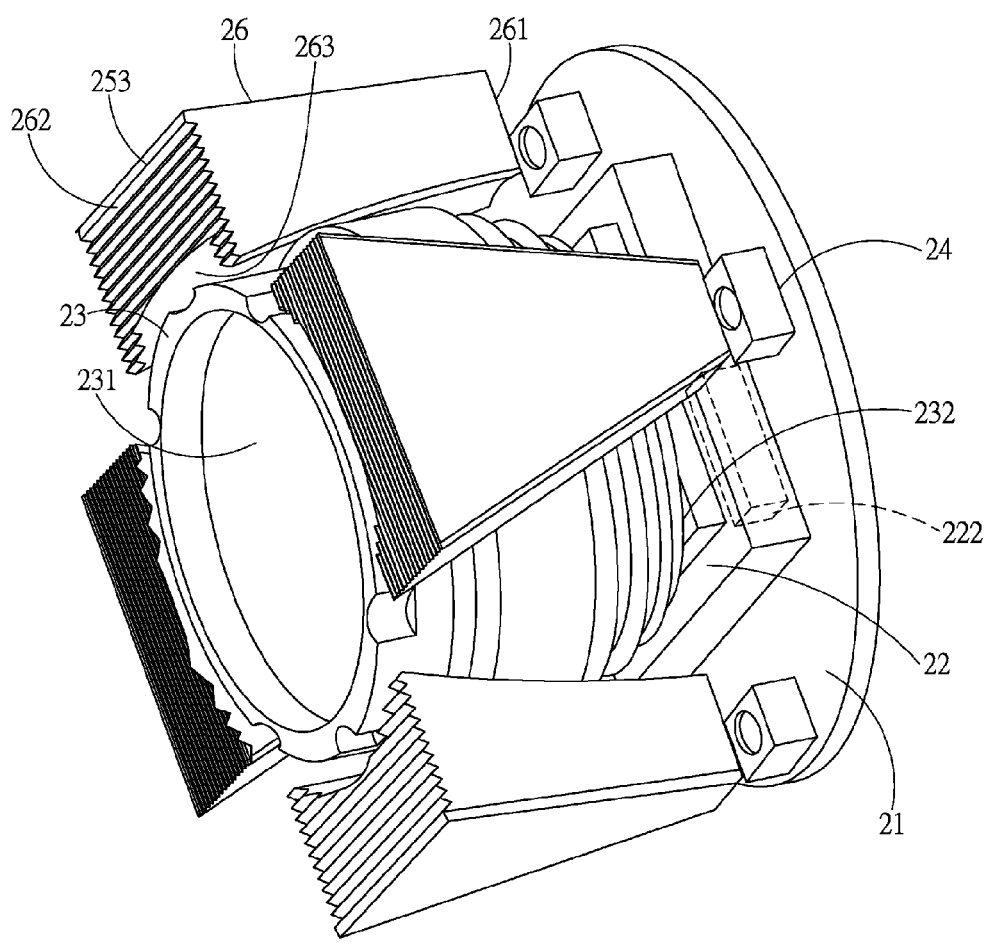
FIG. 5B is an outside three-dimensional view illustrating the structure of the second embodiment of the present invention.

Referring to FIG. 5A and FIG. 5B, they are respectively an exploded three-dimensional view and an outside three-dimensional view illustrating a structure of a second embodiment of the present invention. In addition to the elements such as the substrate 21, the image sensing module 22, the optical lens module 23, and the plurality of light sources 24 in the preceding embodiment, a plurality of pointing lenses 26 is further included and disposed around the optical lens module 23. Each pointing lens 26 includes a light incident surface 261 and a light exit surface 262. The light incident surface 261 of each pointing lens 26 separately corresponds to each light source 24, that is, the light incident surfaces 261 are joined to corresponding light sources 24. Light beams emitted from the light sources 24 are transmitted via the light incident surfaces 261 to the light exit surfaces 262 and form projection light beams 241.

Still referring to FIG. 5A and FIG. 5B, they are respectively an exploded three-dimensional view and an outside three-dimensional view illustrating the structure of the second embodiment of the present invention. In an embodiment, the optical lens module 23 includes a sidewall 234 between the first end 231 and the second end 232; the pointing lens 26 includes a connecting surface 263 between the light incident surface 261 and the light exit surface 262, and the shape of the connecting surface 263 corresponds to the shape of the sidewall 234. In an implementation aspect, as shown in FIG. 5A and FIG. 5B, the optical lens module 23 is roughly of a cylinder shape, the sidewall 234 of the optical lens module 23 takes a shape of an annular surface, and the connecting surfaces 263 of the pointing lenses 26 are cambered surfaces, so as to correspond to the annular surface, that is, when the plurality of pointing lenses 26 gets close, the connecting surfaces 263 of the pointing lenses 26 form an annular surface similar to that of the sidewall 234 of the optical lens module 23.

Figure 6A:
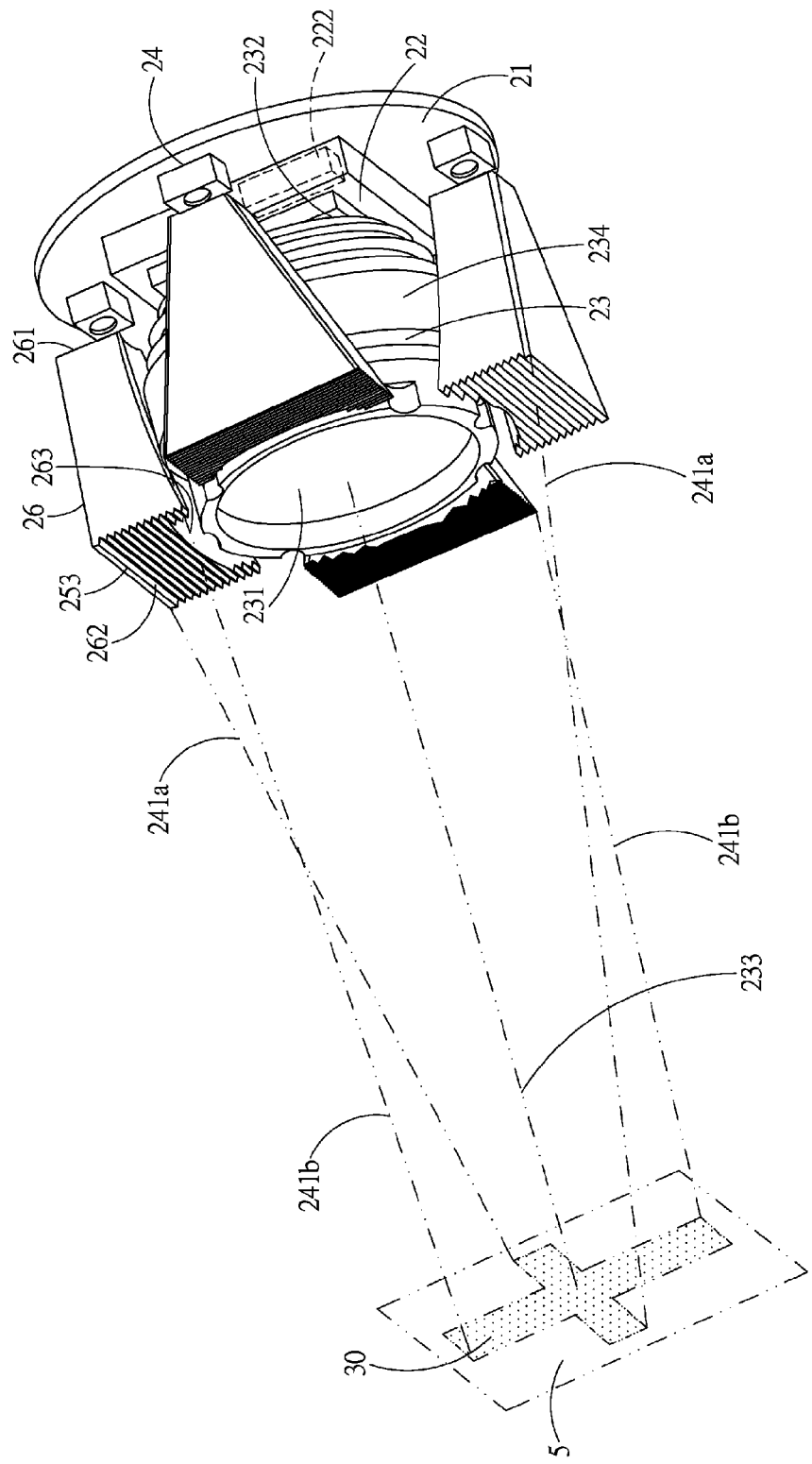
FIG. 6A is a schematic view (I) illustrating a use state of the second embodiment of the present invention.

Referring to FIG. 6A, it is a schematic view (I) illustrating a use state of the second embodiment of the present invention. On the basis of the aforementioned embodiment, as shown in FIG. 5A and FIG. 5B, each of the pointing lenses 26 disposed around the optical lens module 23 includes an optical structure 253. In this embodiment, the optical structure 253 includes a structure at the light exit surface 252 and roughly of a zigzag shape. In an embodiment, a projection light beam 241 formed by a light beam emitted from each light source 24 after passing through a pointing lens 26 corresponding to the light source 24 is a linear projection light beam and forms a linear projection pattern (which can be designed according to requirements, a thin-line shape is formed when the width is small, and a long rectangle is formed when the width is large) when irradiating on the reading surface 5.

Referring to FIG. 6A, FIG. 6B, FIG. 6C, and FIG. 6D, they are respectively schematic views (I)-(IV) illustrating use states of the second embodiment of the present invention. The linear projection light beams formed by the light beams from the light sources 24 after passing through pointing lenses 26 corresponding to the light sources 24 will form a projection pattern 30 on the reading surface 5, and the shape of the projection pattern 30 is selected from a group consisting of a straight line, a cross shape, a * shape, a # shape, and a star shape. For example, in an implementation aspect of FIG. 6A, four pointing lenses 26 are used and are symmetrically arranged on the periphery of the optical lens module 23 at an interval of 90°, linear projection light beams 241a of the upper and lower pointing lenses 26 overlap and form a horizontal stripe on the reading surface 5, linear projection light beams 241b of the left and right pointing lenses 26 overlap and form a straight stripe on the reading surface 5, and the straight stripe and the horizontal stripe cross each other and form a cross-shaped projection pattern 30 (vertical cross in this example, but the present invention is not limited thereto), and the optical axis 233 of the optical lens module 23 passes through a convergent center of the cross-shaped projection pattern 30.

In other use states, if only two light sources 24 and two pointing lenses 26 corresponding to the light sources 24 are used, for example, only the upper and lower pointing lenses 26 exist and the left and right pointing lenses 26 do not exist, and the upper and lower pointing lenses 26 are correspondingly and symmetrically arranged on two corresponding sides on the periphery of the optical lens module 23, two linear projection light beams 241a formed by the light beams emitted from the two light sources 24 after passing through the corresponding upper and lower pointing lenses 26 overlap and form a horizontal stripe on the reading surface 5, that is, only a straight-line shaped projection pattern is formed on the reading surface 5, and the optical axis 233 crosses the straight-line shaped projection pattern. Similarly, if only the left and right pointing lenses 26 are used, two linear projection light beams 241b formed by the light beams emitted from the two light sources 24 after passing through the corresponding left and right pointing lenses 26 overlap and form a straight stripe on the reading surface, that is, a straight-line shaped projection pattern is also formed on the reading surface 5, and the optical axis 233 crosses the straight-line shaped projection pattern.

Figure 6B:
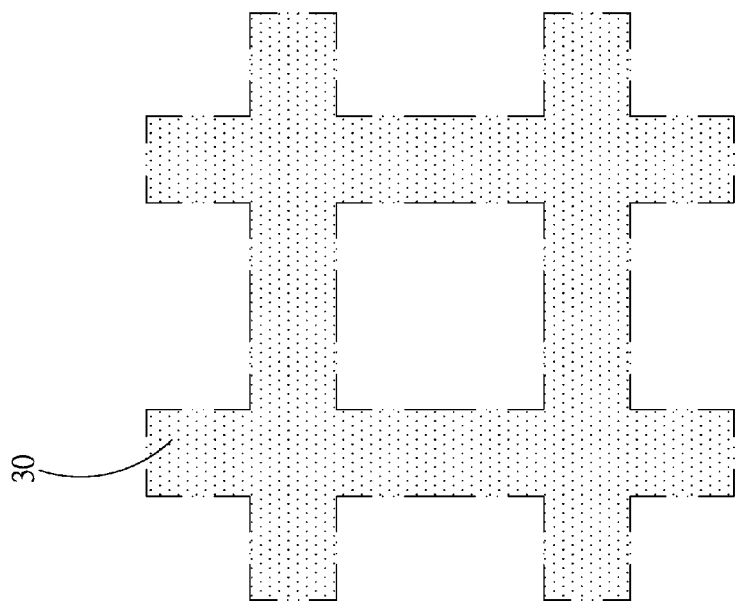
FIG. 6B is a schematic view (II) illustrating a use state of the second embodiment of the present invention.

Referring to FIG. 6B, on the basis of the implementation aspect of FIG. 6A, when the distance of the reading surface 5 relative to the barcode reading apparatus 2 varies or the optical structure 262 varies, the projection light beams 241a and the projection light beams 241b projected from the opposite upper and lower pointing lenses 26 and the opposite left and right pointing lenses 26 do not overlap, a #-shaped pattern is formed, and the optical axis 233 passes through a center of the #-shaped projection pattern 30.

Figure 6C:
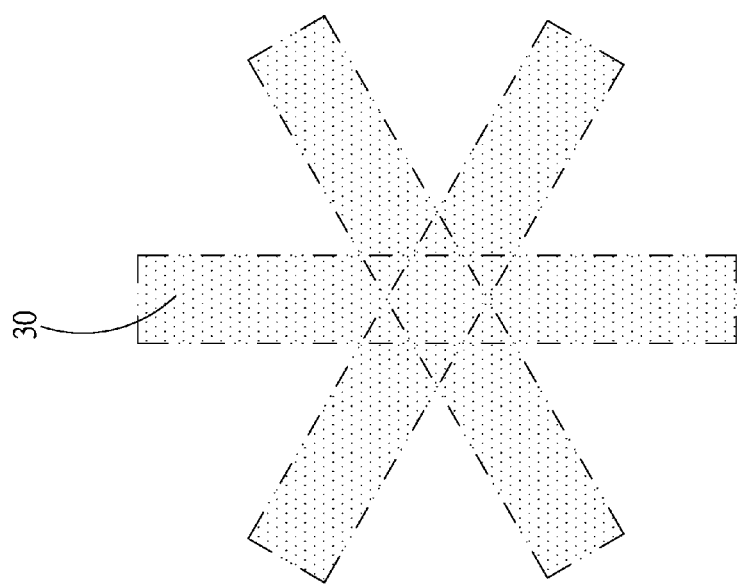
FIG. 6C is a schematic view (III) illustrating a use state of the second embodiment of the present invention.

Referring to FIG. 6C, in another use state, when three light sources 24 and three pointing lenses 26 corresponding to the light sources 24 are used and are symmetrically disposed on the periphery of the optical lens module 23 at an interval of 120° to form a regular triangle, projection light beams 241 formed by the light beams emitted from all the light sources 24 after passing through the pointing lenses 26 corresponding to the light sources 24 overlap and form a *-shaped projection pattern 30 on the reading surface 5, as shown in FIG. 6C, and the optical axis 233 passes through a cross center of the *-shaped projection pattern 30. It should be noted that, since the luminance of the overlapping or crossing region is higher than that of the surrounding region when multiple linear projection light beams 241 overlap or intersect on the reading surface 5, a user can easily determine whether a barcode to be read is aligned with, and the precision of reading the barcode by the image sensing module 22 is also improved.

Figure 6D:
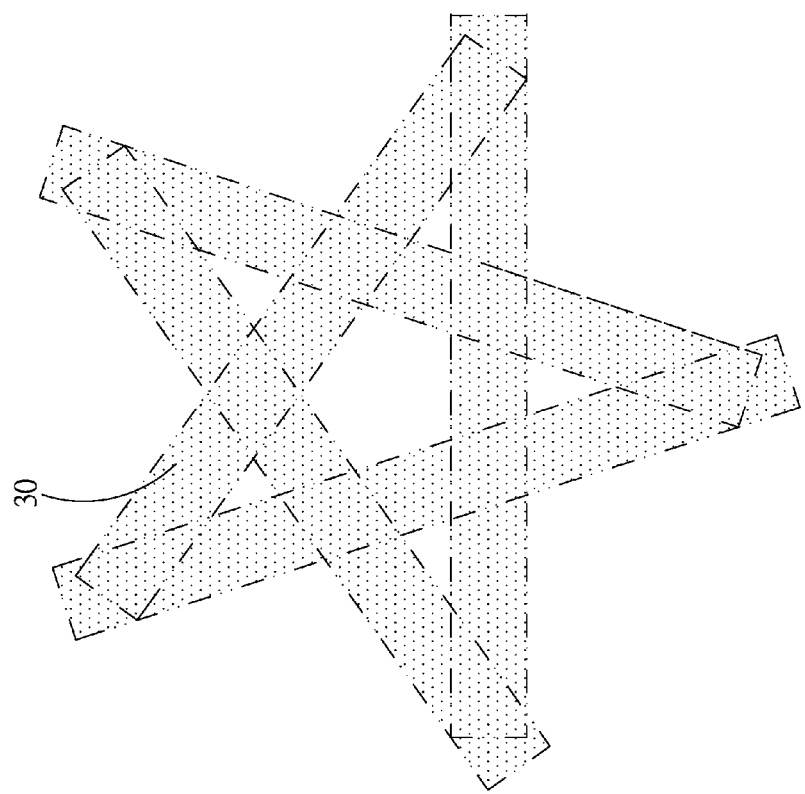
FIG. 6D is a schematic view (IV) illustrating a use state of the second embodiment of the present invention.

In addition, as shown in FIG. 6D, when five light sources 24 and five pointing lenses 26 corresponding to the light sources 24 are disposed on the periphery of the optical lens module 23 at an interval of 72° to form a regular pentagon, projection light beams emitted from all the light sources 24 pass through corresponding pointing lenses 26, then cross, and form a star-shaped projection pattern 30, and the optical axis 233 passes through a center of the star-shaped projection pattern 30. A user can easily determine whether a barcode to be read is aligned with, and the precision of reading the barcode by the image sensing module 22 is also improved. Certainly, the aforementioned five long projection light beams 24130 may also be made intersecting in the same region on the reading surface 5 by changing the design of the pointing lenses 26 or the distance of the reading surface 5. In this way, the luminance of the intersection region is obviously higher than that of the surrounding region, so that a user can easily determine the position pointed to by the optical axis 233.

Figure 7A:
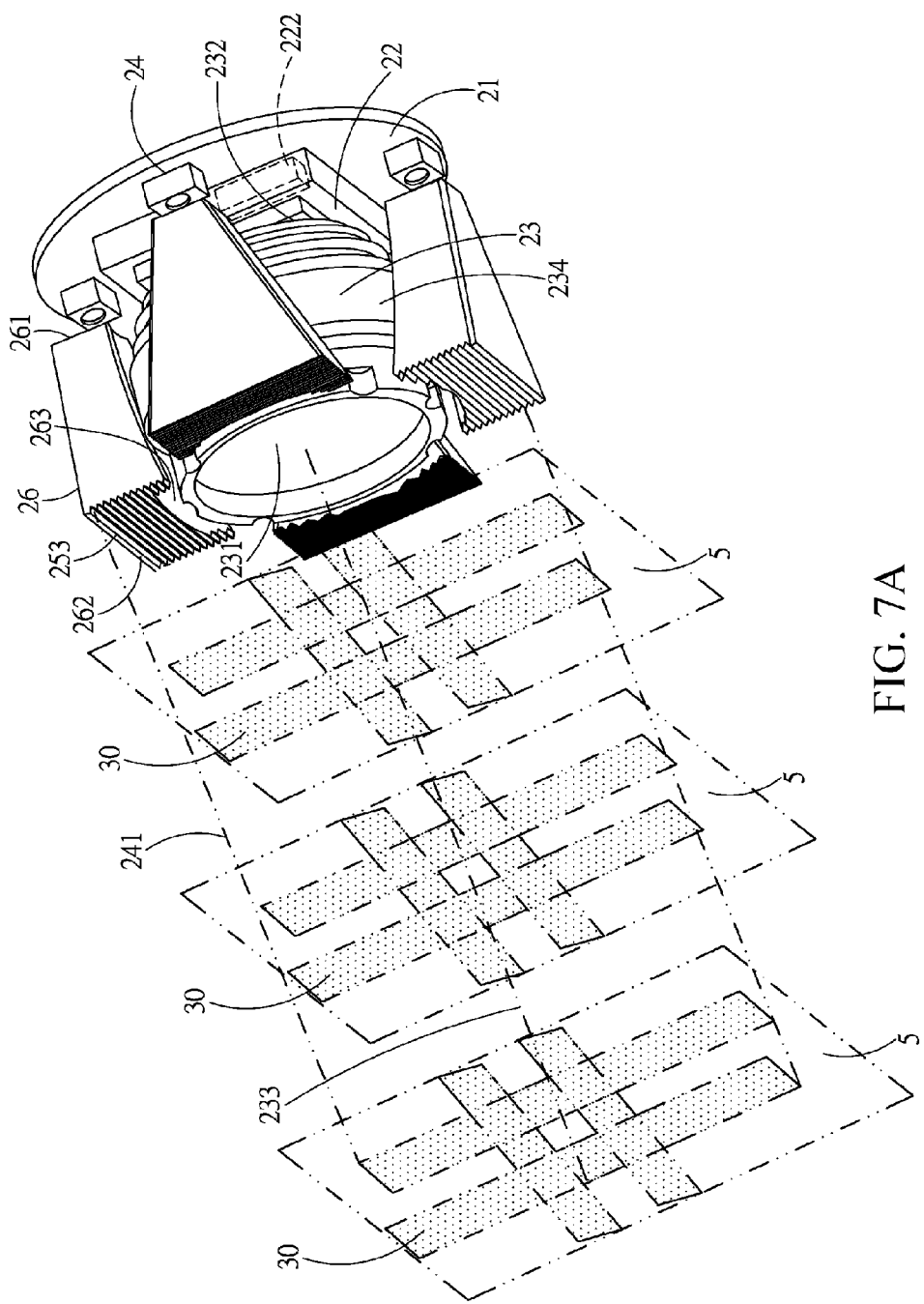
FIG. 7A is a schematic view (V) illustrating a use state of the second embodiment of the present invention.
Figure 7B:
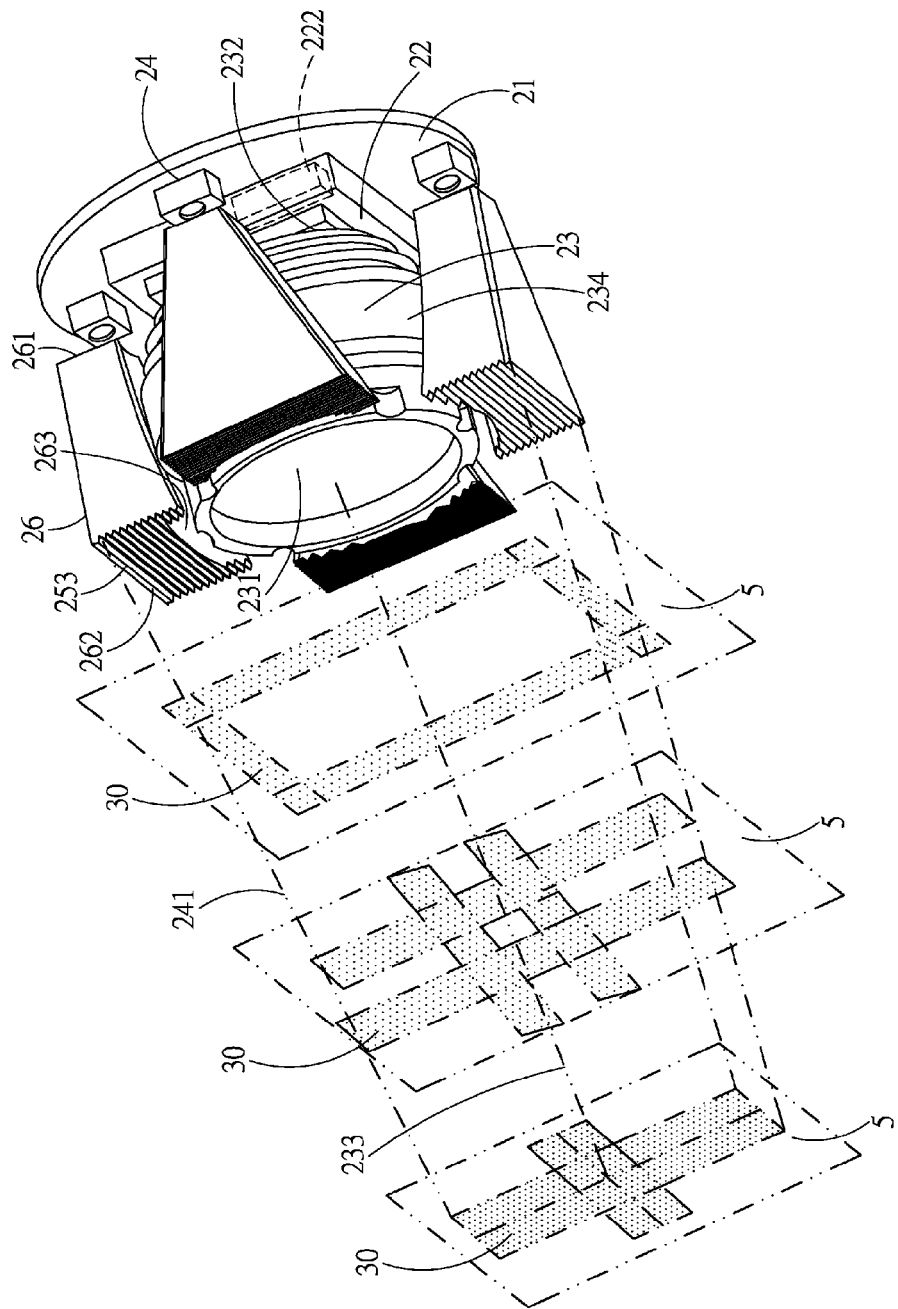
FIG. 7B is a schematic view (VI) illustrating a use state of the second embodiment of the present invention.
Figure 7C:
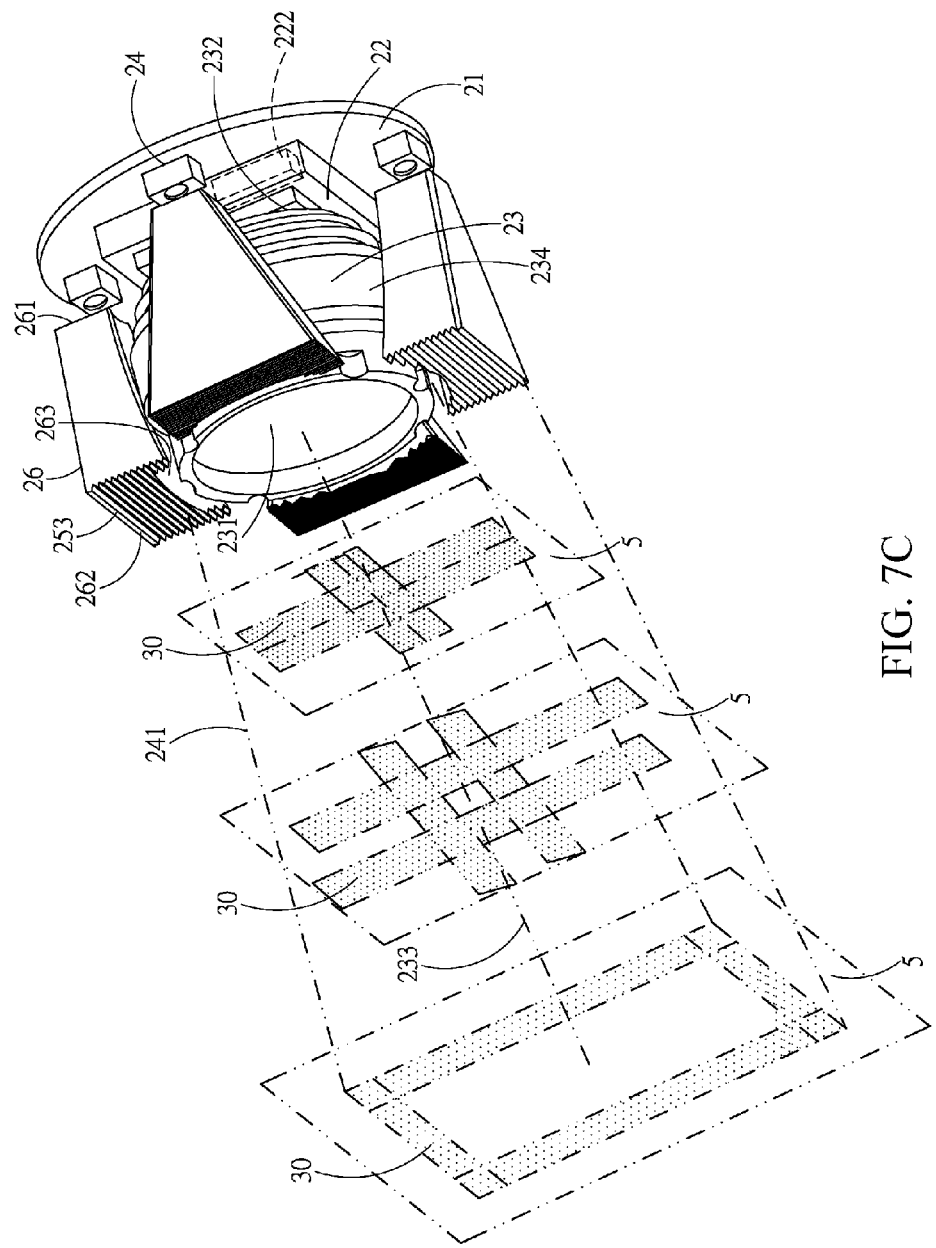
FIG. 7C is a schematic view (VII) illustrating a use state of the second embodiment of the present invention.

Referring to FIG. 7A, FIG. 7B, and FIG. 7C, they are respectively schematic views (V), (VI), and (VII) illustrating use states of the second embodiment of the present invention. The shape of the projection patterns 30 not only is affected by disposition positions of the light sources 24, but also depends on factors such as refraction angles of the projection light beams 241 after passing through the pointing lenses 26 and the distance between the pointing lenses 26 and the reading surface 5. For instance, as shown in FIG. 7A, at a specific distance between the pointing lenses 26 and the reading surface 5, the shape of the projection pattern 30 is a # shape. If the advancing directions of the projection light beams 241 from the light exit surfaces 252 to the reading surface 5 are parallel to the optical axis 233 of the optical lens module 23, the shape formed by the projection pattern 30 is not affected if the distance between the pointing lenses 26 and the reading surface 5 is changed, and the shape of the projection pattern 30 is still a # shape. Further, as shown in FIG. 7B, if the advancing directions of the projection light beams 241 from the light exit surfaces 252 to the reading surface 5 are not parallel to the optical axis 233 of the optical lens module 23 and shrink gradually, the shape of the projection pattern 30 is affected if the distance between the pointing lenses 26 and the reading surface 5 is changed. When the distance between the pointing lenses 26 and the reading surface 5 is increased, the shape of the projection pattern 30 may be a cross shape. When the distance between the pointing lenses 26 and the reading surface 5 is decreased, the shape of the projection pattern 30 may be a rectangle. Further, as shown in FIG. 7C, if the advancing directions of the projection light beams 241 from the light exit surfaces 252 to the reading surface 5 are not parallel to the optical axis 233 of the optical lens module 23 and diverge gradually, the shape formed by the long-stripe projection pattern 30 is affected if the distance between the pointing lenses 26 and the reading surface 5 is changed. When the distance between the pointing lenses 26 and the reading surface 5 is increased, the projection pattern 30 may form a rectangle. When the distance between the pointing lenses 26 and the reading surface 5 is decreased, the projection pattern 30 may form a cross.

Referring to FIG. 8A, FIG. 8B, FIG. 8C, and FIG. 8D, they are respectively schematic views (VIII), (IX), (X), and (XI) illustrating use states of the second embodiment of the present invention. The linear projection light beams 241 formed by the light beams emitted from all light sources 24 after passing through pointing lenses 26 corresponding to the light sources 24 neither intersect nor overlap with each other, and the optical axis 233 of the optical lens module 23 passes through a center of a region enclosed by projection patterns 30 formed by the projection light beams 241 on the reading surface 5.

In an embodiment, each light beam forms a linear projection light beam 241 after passing through the corresponding pointing lens 26, and the linear projection light beams 241 surround to form a projection pattern 30 after being projected on the reading surface 5, the shape of the projection pattern 30 being selected from a group consisting of a straight line, a regular triangle, a square, a regular pentagon, and a regular hexagon.

Figure 8A:
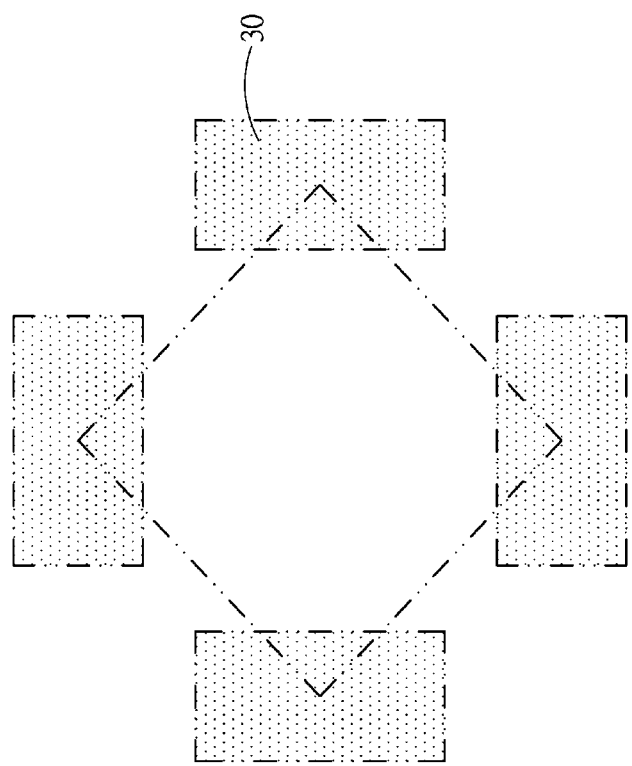
FIG. 8A is a schematic view (VIII) illustrating a use state of the second embodiment of the present invention.
Figure 8B:
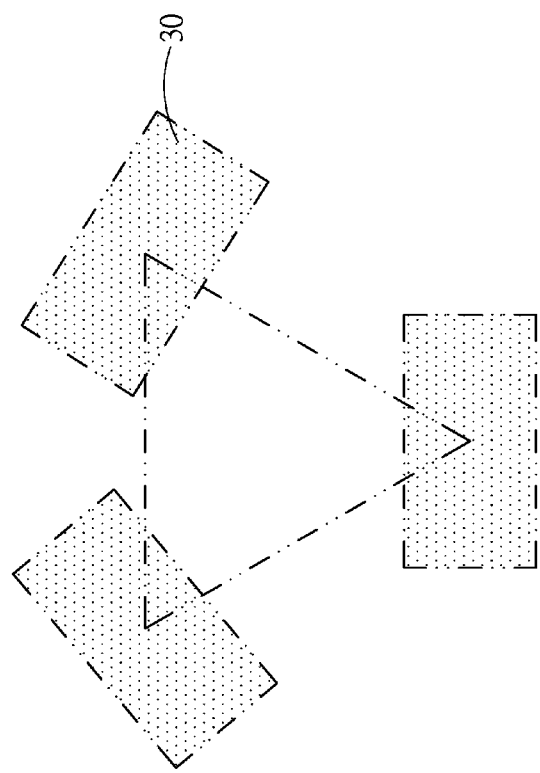
FIG. 8B is a schematic view (IX) illustrating a use state of the second embodiment of the present invention.
Figure 8C:
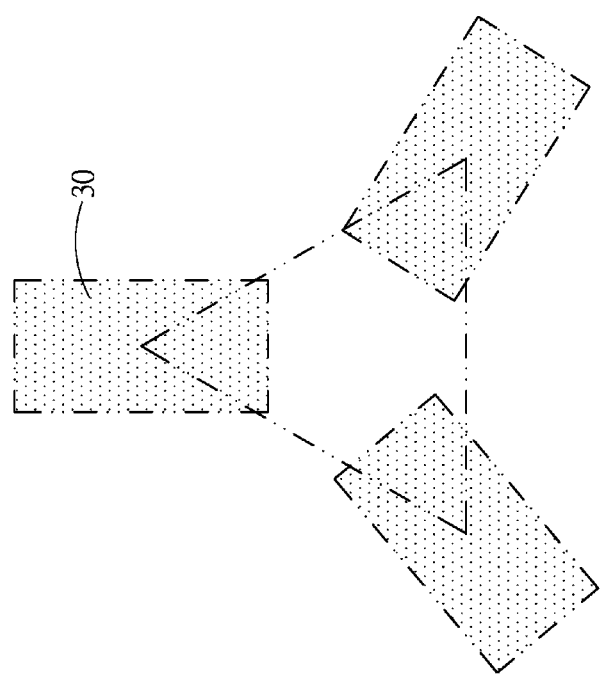
FIG. 8C is a schematic view (X) illustrating a use state of the second embodiment of the present invention.
Figure 8D:
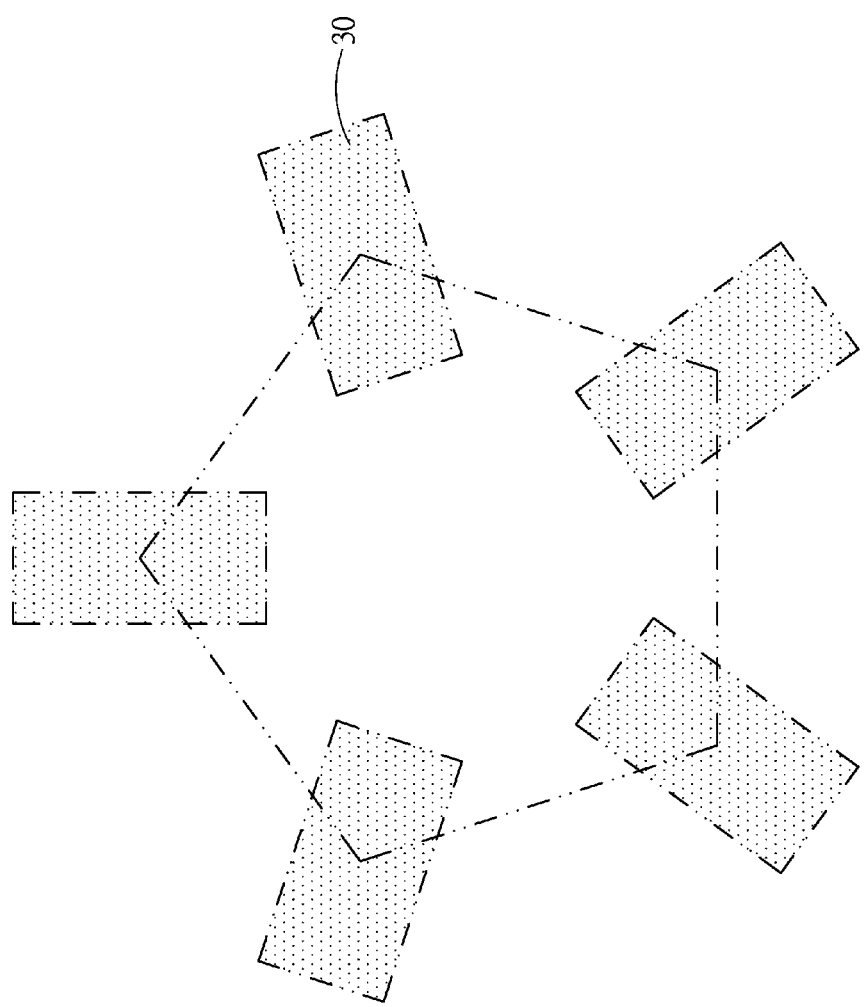
FIG. 8D is a schematic view (XI) illustrating a use state of the second embodiment of the present invention.

For example, as shown in FIG. 8A, when four light sources 24 and four pointing lenses 26 corresponding to the light sources 24 are disposed on the periphery of the optical lens module 23 at an interval of 90°, projection light beams formed by light beams emitted from all the light sources 24 after passing through the corresponding pointing lenses 26 assume four linear stripes which are arranged in a surrounding manner, vertical to each other, and do not without intersect, on the reading surface 5 (that is, no matter whether the four linear projection patterns overlap with each other). As shown in FIG. 8B and FIG. 8C, when three light sources 24 and three pointing lenses 26 corresponding to the light sources 24 are disposed on the periphery of the optical lens module 23 at an interval of 120°, projection light beams formed by light beams emitted from all the light sources 24 after passing through the corresponding pointing lenses 26 assume projection patterns 30 which are arranged in a triangular surrounding manner on the reading surface 5 (that is, connection lines of centers of the three linear projection patterns form a pattern of a regular triangle, no matter whether the three linear projection patterns overlap with each other). Further, as shown in FIG. 8D, when five light sources 24 and five pointing lenses 26 corresponding to the light sources 24 are disposed on the periphery of the optical lens module 23 at an interval of 72°, projection light beams formed by light beams emitted from the light sources 24 after passing through the corresponding pointing lenses 26 assume projection patterns 30 arranged in the shape of a regular pentagon in a surrounding manner (that is, no matter whether the five linear projection patterns overlap with each other). In this implementation aspect, although the projection patterns 30 do not form an enclosed pattern, the central position of the projection patterns 30 is the position pointed to by the optical axis 233, that is, a user can easily determine whether a barcode to be read is aligned with, and the precision of reading the barcode by the image sensing module 22 is further improved.

Through the aforementioned embodiments and implementation aspects, it can be known that the present invention is characterized in that a barcode read position is indicated by projection light beams 241 emitted from the light sources 24 disposed around the optical lens module 23, and since the connection line of the disposition positions of the light sources 24 is axially or radially symmetric, a user can make the image sensing module 22 accurately read a barcode according to the indication of the projection light beams 241 emitted from the light sources 24 within the distance that can be sensed by the image sensing module 22. Thereby, the problem in the prior art that, because the position indicated by a projection light beam 241 emitted from the light source 24 actually is inconsistent with the position pointed to by the optical axis 233 of the optical lens, namely, the position of an image acquired by the image acquisition module, a user often mistakes the position indicated by the projection light beam 241 for an image acquisition position of the image acquisition module when operating the barcode reading apparatus 2 in the prior art to read a barcode, causing a barcode read failure, is solved.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A barcode reading apparatus, comprising:
    a substrate;
    an image sensing module, disposed on the substrate;
    a optical lens module, comprising a first end and a second end opposite to the first end, wherein the second end is adjacent to the image sensing module, and an optical axis is defined in the optical lens module;
    a plurality of light sources for emitting light beams, disposed around the optical lens module, wherein a connection line of disposition positions of the light sources is axially or radially symmetric about the optical axis; and
    at least one lens, distributed on the periphery of the optical lens module and corresponding to the plurality of light sources, so that the light beams emitted from the plurality of light sources pass through the lens to form projection light beams, which irradiate on a reading surface to form a projection pattern, and the optical axis passes through a center of the projection pattern;
    wherein the at least one lens comprises a plurality of pointing lenses symmetrically arranged on the periphery of the optical lens module and respectively corresponding to at least one of the plurality of light sources; and
    wherein a projection light beam formed after passing through each of the pointing lenses is a linear projection light beam, the projection pattern is formed by all the linear projection light beams projected on the reading surface, and the optical axis passes through a center of the projection pattern.

2. The barcode reading apparatus according to claim 1, wherein the projection pattern is formed by the projection light beams by means of overlapping or intersecting and is in a shape selected from a group consisting of a straight line, a cross shape, a * shape, a #shape, and a star shape.

3. The barcode reading apparatus according to claim 1, wherein the projection pattern is formed by arranging the projection light beams in a surrounding manner and is in a shape selected from a group consisting of a regular triangle, a square, a regular pentagon, and a regular hexagon.

4. The barcode reading apparatus according to claim 1, wherein each of the plurality of pointing lens comprises a light incident surface and a light exit surface, wherein the light incident surface faces the light sources.

5. The barcode reading apparatus according to claim 4, wherein each of the plurality of pointing lens comprises an optical structure.

6. The barcode reading apparatus according to claim 5, wherein the optical structure comprises a structure disposed on the light exit surface and of a ladder or zigzag shape.

* * * * *